(12) United States Patent
Chang et al.

(10) Patent No.: US 7,546,640 B2
(45) Date of Patent: *Jun. 9, 2009

(54) FINE-GRAINED AUTHORIZATION BY AUTHORIZATION TABLE ASSOCIATED WITH A RESOURCE

(75) Inventors: David Yu Chang, Austin, TX (US); Vishwanath Venkataramappa, Austin, TX (US); Leigh Allen Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 835 days.

This patent is subject to a terminal disclaimer.

(21) Appl. No.: 10/732,628

(22) Filed: Dec. 10, 2003

(65) Prior Publication Data

US 2005/0132220 A1 Jun. 16, 2005

(51) Int. Cl.
*H04L 9/32* (2006.01)
*H04N 7/16* (2006.01)
(52) U.S. Cl. .................... 726/28; 726/1; 726/4; 726/29
(58) Field of Classification Search ................ 726/4, 726/1, 28, 29
See application file for complete search history.

(56) References Cited

U.S. PATENT DOCUMENTS

| | | | | |
|---|---|---|---|---|
| 5,787,427 A | * | 7/1998 | Benantar et al. ................ 707/9 |
| 5,903,720 A | * | 5/1999 | Stokes ........................... 726/4 |
| 5,911,143 A | * | 6/1999 | Deinhart et al. ......... 707/103 R |
| 5,991,877 A | * | 11/1999 | Luckenbaugh ................. 726/1 |
| 6,023,765 A | * | 2/2000 | Kuhn ............................. 726/4 |
| 6,044,466 A | * | 3/2000 | Anand et al. .................... 726/1 |
| 6,047,377 A | * | 4/2000 | Gong ........................... 726/21 |
| 6,173,404 B1 | * | 1/2001 | Colburn et al. ................ 726/17 |
| 6,202,066 B1 | * | 3/2001 | Barkley et al. ................. 707/9 |
| 6,289,462 B1 | * | 9/2001 | McNabb et al. .............. 726/21 |
| 6,412,070 B1 | * | 6/2002 | Van Dyke et al. ............. 726/17 |
| 6,466,932 B1 | * | 10/2002 | Dennis et al. .................. 707/3 |
| 6,535,884 B1 | * | 3/2003 | Thornton et al. ............ 707/100 |
| 6,625,603 B1 | * | 9/2003 | Garg et al. ...................... 707/9 |
| 6,772,167 B1 | * | 8/2004 | Snavely et al. .............. 707/102 |
| 6,917,975 B2 | * | 7/2005 | Griffin et al. ................ 709/225 |

(Continued)

OTHER PUBLICATIONS

U.S. Patent Application entitled "Fine-Grained Authorization Using MBeans," filed herewith, David Yu Chang, et al.

(Continued)

*Primary Examiner*—David G Cervetti
(74) *Attorney, Agent, or Firm*—Justin M. Dillon; Schubert Osterrieder & Nickelson PLLC

(57) ABSTRACT

Methods, systems, and media are disclosed for determining access rights to a resource managed by an application. One embodiment includes receiving a request by the application, wherein the request comprises an action a user seeks to perform on the resource. Further, the embodiment includes locating, based on the request, the resource in a structure having groupings of resources, wherein the groupings include a grouping having the resource. Typically the groupings comprise files having mappings of resources to assigned groups, and each group has an associated authorization table mapping roles or policies to users. Further still, the embodiment includes reading an authorization table associated with the grouping having the resource, and determining whether to grant the access rights for performing the action on the resource.

30 Claims, 5 Drawing Sheets

U.S. PATENT DOCUMENTS

| | | | |
|---|---|---|---|
| 6,928,427 B2* | 8/2005 | Rajasekaran et al. ............ 707/2 |
| 6,944,777 B1* | 9/2005 | Belani et al. ................. 713/150 |
| 6,950,825 B2* | 9/2005 | Chang et al. ................. 707/100 |
| 6,985,955 B2* | 1/2006 | Gullotta et al. ............. 709/229 |
| 6,993,589 B1* | 1/2006 | Blumenau et al. ........... 709/229 |
| 7,020,653 B2* | 3/2006 | Idicula et al. ................. 707/10 |
| 7,065,783 B2* | 6/2006 | Rygaard ........................ 726/4 |
| 7,124,192 B2* | 10/2006 | High et al. ................... 709/229 |
| 7,131,000 B2* | 10/2006 | Bradee ........................ 713/164 |
| 7,185,015 B2* | 2/2007 | Kester et al. .................. 707/10 |
| 7,197,764 B2* | 3/2007 | Cichowlas ..................... 726/6 |
| 7,219,234 B1* | 5/2007 | Ashland et al. ............. 713/182 |
| 7,222,369 B2* | 5/2007 | Vering et al. .................. 726/28 |
| 7,260,831 B1* | 8/2007 | Beznosov et al. ............... 726/2 |
| 7,343,628 B2* | 3/2008 | Buchholz et al. ............. 726/28 |
| 7,373,388 B2* | 5/2008 | Leukert-Knapp et al. ... 709/207 |
| 7,404,203 B2* | 7/2008 | Ng ................................. 726/6 |
| 2001/0056494 A1* | 12/2001 | Trabelsi ....................... 709/229 |
| 2002/0083340 A1* | 6/2002 | Eggebraaten et al. ....... 713/201 |
| 2002/0095571 A1* | 7/2002 | Bradee ........................ 713/164 |
| 2002/0143766 A1* | 10/2002 | Rajasekaran et al. ........... 707/9 |
| 2002/0156904 A1* | 10/2002 | Gullotta et al. ............. 709/229 |
| 2002/0178119 A1* | 11/2002 | Griffin et al. .................. 705/54 |
| 2003/0115228 A1* | 6/2003 | Horvitz et al. .............. 707/500 |
| 2003/0172161 A1* | 9/2003 | Rymon ....................... 709/226 |
| 2003/0221012 A1* | 11/2003 | Herrmann et al. ........... 709/229 |
| 2004/0019799 A1* | 1/2004 | Vering et al. ................. 713/200 |
| 2004/0024875 A1* | 2/2004 | Horvitz et al. .............. 709/226 |
| 2004/0060002 A1* | 3/2004 | Lucovsky et al. ............ 715/513 |
| 2004/0139092 A1* | 7/2004 | Jones et al. .................. 707/100 |
| 2004/0162894 A1* | 8/2004 | Griffin et al. ................. 709/223 |
| 2004/0225893 A1* | 11/2004 | Ng .............................. 713/200 |
| 2004/0225896 A1* | 11/2004 | Ng .............................. 713/201 |
| 2004/0243822 A1* | 12/2004 | Buchholz et al. ............. 713/200 |
| 2005/0097352 A1* | 5/2005 | Patrick et al. ............... 713/200 |
| 2005/0251852 A1* | 11/2005 | Patrick et al. .................. 726/1 |
| 2008/0114769 A1* | 5/2008 | Buchholz et al. ............... 707/9 |

OTHER PUBLICATIONS

U.S. Patent Application entitled "Fine-Grained Authorization By Traversing Generational Relationships," filed herewith, David Yu Chang, et al.

Longhua Zhang, et al., A Rule-Based Framework for Role-Based Delegation, SACMAT'01, May 3-4, 2001, Chantilly, Virginia, USA, pp. 153-162.

Mohammed A. Al-Kahtani, et al., Induced Role Hierarchies with Attribute-Based RBAC, SACMAT'03, Jun. 1-4, 2003, Como, Italy, pp. 1-7.

Longhua Zhang, et al., A Rule-Based Framework for Role-Based Delegation and Revocation, ACM Transactions on Information and System Security, vol. 6, No. 3, Aug. 2003, pp. 404-441.

\* cited by examiner

| Role | User(s) |
|---|---|
| Operator | Pam, Erik |
| Monitor | Jeff |
| Configurator | John, Pam |
| Administrator | Leslie |

FIG. 2

FINE-GRAINED AUTHORIZATION BY AUTHORIZATION TABLE ASSOCIATED WITH A RESOURCE

FIELD OF INVENTION

The invention generally relates to controlling access rights for resources managed by an application. More particularly, the invention relates to methods, systems, and media for resources grouped with similar authorization constraints or policies, and granting access rights to act on a resource in the group based on the role of the user.

BACKGROUND

In a networked environment, users have access to resources on the network. Resources, for instance, include nodes (i.e., computer systems), servers, applications, and clusters (i.e., collection of application servers). In order to access these resources, the network uses a security process requiring a user to log onto the network with a user identifier and password. After network verification, the user has access to all the resources on the network.

Management of these resources, however, typically occurs through use of an application server system, such as WebSphere Application Server™, which is in communication with the network. Managing resources includes, for example, stopping and starting a server, tuning a server, reading a log file on a node, and so forth. Before managing resources, however, an application may also require a security process for a user to log into the application. The security process may be the same or similar to the user identifier and password required for logging onto the network. Now, after verification, the user has access to all the resources, which the user may manage in an unfettered manner.

Oftentimes, organizations wish to restrict generalized access to resources on the network to prevent security breaches, such as infiltration and corruption, as well as to ensure proper management, such as configuration, administration, operation, and monitoring of the resources. To restrict access, implementation of additional security processes is necessary. Implementing additional processes requires additional constraints placed on both the user and/or the resource. These additional constraints are collectively termed "fine-grained authorization," as opposed to the "coarse-grained authorization," or generalized authorization, described above in terms of verification of user identifier and password.

Prior solutions for restricting, i.e., controlling, access to resources include use of policy-based authorization ("PBA") systems. PBA is a fine-grained authorization technique that assigns access control policies to a user or group of users for permitted actions on the resources, that is, "permissions." The permissions may include a variety of actions, such as stopping, starting, reading a log, tuning, or other actions on a particular resource. In addition, each permission is associated with one or more authorized users, who may perform the action. For example, if a PBA grants only configuration of server 1, but not server 2, to user A, then user A may configure server 1, but not server 2; additionally, user A would not have access rights to administrator, monitor or operate either server 1 or server 2. In sum, a PBA is often a file or list comprising one or more users assigned to an action on a resource in the form of (user/group name, resource, action).

Role-based authorization ("RBA") is another, fine-grained authorization solution for restricting, i.e., controlling, access to resources. RBA assigns users to roles, wherein a role is a collection of actions for performing on resources, or, in PBA terms, a role is a set of permissions. Stated still another way, a role is most easily imagined as a definition of a job at the lowest level of granularity used in the organization. The roles may include a starter of a server, a stopper of a server, a tuner of a server, a modifier of an application, an administrator, and so forth, wherein each role is indicative of a set of permissible actions that the user assigned to the role has on a particular resource. For example, if an RBA grants only a role of configurator to user A for configuring server 1, but not for configuring server 2, then user A may configure server 1, but not server 2; additionally, user A, as configurator, would not have administrator, monitor or operator roles for acting on either server 1 or server 2. Overall, in an RBA control system, the system administrator need only grant or revoke access rights to a role, and group different subjects under a role in order to control the RBA system. In sum, an RBA is a file or list comprising one or more users assigned to a role defining the permissible actions for a resource in the form of (user/group name, role, resource).

Although providing added security, the prior solutions fail to do so with optimized scalability for managing the resources. That is, every resource using conventional PBA or RBA systems require each resource to have its own roles or policies with the likely structure including individual files for each resource, wherein the files fail to consider similarities in management authority and/or resources subject to a user's management authority. An individual file structure for each resource can quickly become a scalability nightmare for organizations having thousands of users. For instance, if there are a thousand resources, and, for sake of simplicity, assuming one role or one policy for each resource, then there are a thousand roles or a thousand policies for a given user. As a result of the un-optimized security system, another failure of the prior solutions is borne out: a relatively, high storage requirement for storing the many roles or policies for each user.

A need, therefore, exists, for methods, devices, systems, and media to provide for fine-grained authorization of administrative resources that optimizes scalability that also results in reducing storage requirements for implementation of the security system.

SUMMARY OF THE INVENTION

Embodiments of the invention generally provide methods, systems, and media for determining access rights to a resource managed by an application. In one embodiment, the method generally includes receiving a request by the application, wherein the request comprises an action a user seeks to perform on the resource. Further, the method includes locating, based on the request, the resource in a structure having groupings of resources, wherein the groupings include a grouping having the resource. Further still, the method includes reading an authorization table associated with the grouping having the resource, and determining whether to grant the access rights for performing the action on the resource.

In another embodiment, the invention provides a system for determining access rights to a resource managed by an application. The system includes an input module for receiving a request from a user in order to perform an action on a resource. Further, the system includes a locator module for locating a structure having groupings of resources, wherein the groupings include a grouping having the resource. Further still, the system includes a reader module for reading the authorization table associated with the grouping having the resource, and a decision module for determining whether to grant the access rights for performing the action on the resource.

In yet another embodiment, the invention provides a machine-accessible medium containing instructions for determining access rights to a resource managed by an application, which when executed by a machine, cause the machine to perform operations. The instructions generally include operations for receiving a request by the application, wherein the request comprises an action to be performed on the resource. Further, the instructions include operations for locating, based on the request, the resource in a structure having groupings of resources that includes a grouping having the resource. Further still, the instructions include operations for reading an authorization table associated with the grouping having the resource, and for determining whether to grant the access rights for performing the action on the resource.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 depicts an authorization table in accordance with the disclosed invention.

DETAILED DESCRIPTION OF THE EMBODIMENTS

Figure 1:
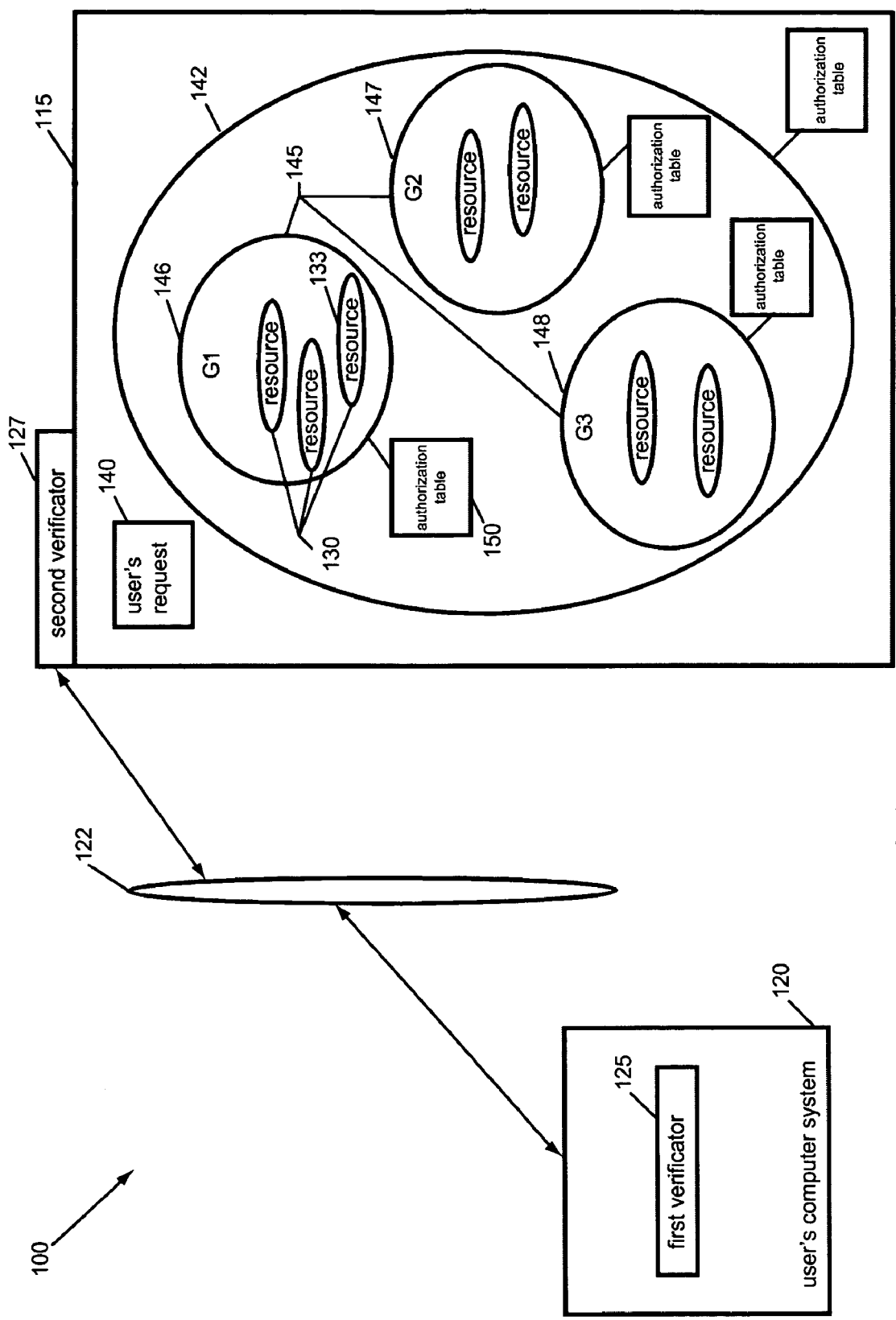
FIG. 1 depicts a system for determining access rights to a resource managed by an application in accordance with the disclosed invention.

The following is a detailed description of example embodiments of the invention depicted in the accompanying drawings. The embodiments are examples and are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, methods, and media for determining access rights to a resource managed by an application are contemplated. Embodiments include a networked environment, wherein a user has access, through, for example, verification of a user identifier and password, to an application for management of resources within a cell. Recognizing a cell as a collection, for whatever reason, of certain resources, then within the cell resides resources, which optionally include, for example, smaller cells, nodes (i.e., computer systems), servers, applications, and clusters, which are collections of application servers.

Verification of user identifier and password, however, merely provides coarse-grain authorization to the resources accessible through the application permitting management of the resources. Additional security constraints on a cell's resources, however, may restrict a user's actions to some or all of the resources in the cell. Implementation of such additional security or authorization requirements is called fine-grained authorization, which may result from using conventional role and/or policy-based access control techniques. Embodiments of the invention, however, have significantly modified these conventional techniques to create a new technique called authorization group to determine whether to grant access rights to a user seeking to act on a resource. The authorization group arises by grouping resource instances having similar authorization constraints, and it is possible to explain the origins of the authorization group from either a policy based authorization ("PBA") system approach or a rule-based authorization system approach. Before showing the theory behind creation of the authorization group, however, it is preferable to provide further discussion of the embodiments.

After a user accesses the application, the user submits a request representing action to be performed on a resource. Granting access rights to the user for the requested action on the particular resource depends on whether the particular resource is in a grouping to which the user has access rights, and whether the user has access rights to perform the requested action. With the resources already grouped by similar authorization constraints, a task configured and re-configurable by a system administrator or the like, locating the particular resource in a group, and reading an authorization table attached to the grouping containing the resource determines whether to grant access rights to the user to perform the requested action on the particular resource.

With this overview, it is helpful to discuss some general concepts behind the disclosed, fine-grained, authorization methods, systems, and media before continuing on to the theory behind the creation of the authorization table. Every resource has a "type" attribute. That is, for example, a resource can be a server type or application type. In addition, there may be multiple "instances" of resources of the same type, such as, multiple servers or multiple applications. All types and instances of resources in a cell, however, often do not require different authorization constraints, and, as a result, such similarly constrained types and instances of resources may be grouped together with the same authorization constraints. Such a grouping of resources within a cell is called an "authorization group" or a "resource group," collectively called "groups." After forming these groups, it is already apparent that assigning users to these groups improves scalability and storage requirements, as compared to prior solutions, which assign resource instances to individual users (i.e., a file for each individual) or without grouping as to similar constraints.

Turning now to explaining the theory behind the authorization table, from the RBA perspective, a typical role involves mapping users to roles and mapping roles to permissions. A user/group is a person or persons, and a role is a collection of permissions, wherein a permission is a resource and an action, such as stopping or starting a resource. The user mapping to roles may be represented by an "authorization table," whether or not the authorization table actually comprises a table, or is represented by file(s), list(s), or so on. Instead of the conventional mapping of roles to permissions, however, a new approach is disclosed that maps roles to one of a discrete number of actions, wherein the roles subsume the actions. In an example embodiment, administration of the permitted actions on all resources can be broadly defined by four classes labeled administrative action, configuration action, operational action, and monitor action, wherein the roles adopt the names of the permitted actions, i.e., administrator configurator, operator, and monitor, respectively. As a result, embodiments result in a mapping of authorization table to resource group, wherein resource group, as above-defined, are similarly constrained types and instances of resources already configured into groups.

From the PBA perspective, a typical policy reads (user/group, resource group, action), wherein user/group is a person or persons, resource group is above-defined, and action is an operation, such as stopping or starting a server, to be performed on a particular resource. Again, in embodiments of the invention, all possible actions on resources in a resource group are definable in terms of four classes labeled administrative action, configuration action, operational action, and monitor action. Re-writing the typical policy in these defined classes yields (user/group, resource group, {administrative action, configuration action, operational action, and monitor action}). Again, re-writing these actions in terms of the four roles yields (user/group, resource group, {administrator, configurator, operator, and monitor}). Final reduction from the PBA perspective yields the same result as from the RBA perspective, that is, a mapping of authorization table to resource group. Therefore, the authorization table may be explained from either a PBA or an RBA perspective. As a final matter, it is understood that variance in terms of the number of defined roles on the resource, the specific actions permitted by the roles, and the uses beyond administrative management of resources on computers systems, such as on PDAs, are contemplated and within the scope of the invention, although further examples are not explicitly discussed herein.

Turning now to the drawings, FIG. 1 depicts an embodiment of a system 100 for determining whether to grant or deny access rights to a resource 130 managed by an application 115. FIG. 1 depicts a user's computer system 120 in communication through a network connection 122 to an application 115 associated with a non-depicted, remote computer system. The remote computer system, for example, may be a PDA, a stand-alone computer system, or part of a network of computer systems that is either on the same or different network than the user's computer system 120.

Before accessing application 115 associated with the remote computer system, the system 100 depicts a first verificator 125 on the user's computer system 120 and an optional, second verificator 127 associated with the application 115. The first verificator 125 requires the user to enter identifying information, such as a user identifier and a password, which is verified by logic associated with the user's computer system 120 to determine whether to grant access to the user's computer system 120. The optional, second verificator 127 functions in much the same way as the first verificator 125. That is, the second verificator 127 requires the user to enter identifying information, which may be the same or different from the identifying information used for accessing the user's computer system 120, and after verification by logic associated with the second verificator 127, the user has access to the application 115.

Once access to the application 115 exists, the system's 100 application 115 receives a user's request 140 for an action on a resource, say, resource 133, for example. Before discussing the request 140, it is worthwhile to understand the purpose behind the application 115. The application 115, whether local or remote to the user's computer system 120, is used for managing an organization's resources 130, such as nodes (i.e., computer systems), servers, applications, and clusters (i.e., collection of application servers). The application 115, for example, is an application management server system, such as IBM™ WebSphere Application Server™ or Vitria™ BusinessWare™, and/or may include application management systems available through Web Services, which have defined core protocols, query language, interfaces, and specifications, all of which provide for easy integration into the system 100 for enterprise management solutions.

Managing an organization's resources 130, in an administrative manner, for example, entails many actions that a user may seek to perform on the resources 130. After logging on to the user's computer system 120, a user may enter a request 140 to perform an action on a resource 133, wherein resource 133 is enumerated in FIG. 1 for clarity of this discussion. Logic associated with the user's computer system 120 and/or the application 115 may prompt the user to enter the request 140, which is then processed by the application 115 to identify the requested action that the user wishes to perform on the requested resource, such as resource 133. For example, the request 140 may state, "tune server 17." Upon receipt of the request 140 by the application 115, logic, enabled by software and/or hardware, interprets the request 140 and understands that the request 140 means that the user wishes to perform the action of "tuning" on the resource already bearing the identity of "server 17."

The system 100 includes locating the requested resource, again, say resource 133, for beginning to determine whether the user has access rights. As a pre-condition to implementing the system 100, however, a system administrator or otherwise empowered authority has grouped the system's 100 resources into groupings 145 of resources 130 having similar authorization constraints within a cell 142, which encompasses all of the organization's resources 130; these groupings 145 are also re-configurable if the organization desires or needs to change the constraint for whatever reason. For instance, FIG. 1 depicts three groupings 145, namely G1 146, G2 147, and G3 148, wherein each of the groupings 145 contain similarly constrained resources 130 within their respective groupings 145. The groupings 145, themselves, for example, are lists or XML™ (e.g., a general-purpose markup language called "eXtensible Markup Language") files arranged in a structure, and logic associated with the application 115 searches the files in the structure to locate the group containing the requested resource, such as resource 133, among the groupings 145. By example, FIG. 1 shows G1 146 to contain the resource 133.

After locating the group containing the requested resource, the system 100 includes reading an authorization table 150 associated with the group having the requested resource on which the user seeks to perform an action; in FIG. 1, by example only, the requested action is sought to be performed on resource 133 within G1 146. Each of the groupings 145 has an associated authorization table 150 that maps roles to users, wherein FIG. 2 depicts an example authorization table, which is labeled 150 in FIG. 1. For the resources in any particular group, the roles are permitted actions on the resources in that group. With the system 100 used for administration of resources, the roles, for example, may be limited to four broadly defined classes, including administrator, operator, configurator, and monitor, wherein the roles' namesakes also broadly represent the permitted actions, that is, administrating, operating, configuring, and monitoring, respectively. Variance of the system 100 in terms of the number of defined roles on the resource, the specific actions permitted by the roles, and the uses of the system 100 beyond administrative management of resources are contemplated and within the scope of the invention, although further examples are not explicitly discussed herein.

Returning to the example embodiment of administrative management of the resources, explanation of the actions associated with the four roles include: an administrator having all actions over the resources in a group; an operator having start and start actions, for example, over resources in a group; a configurator having tuning actions, for example, associated with the resources in a group; and a monitor having reading and displaying actions, for example, over resources in a group. With this understanding of the actions incorporated into the roles, then logic associated with the authorization table for reading the authorization table, which takes the form of a list or files, such as XML™ files, renders possible a determination whether to grant or deny access rights to the requested action on the requested resource.

To determine whether to grant access rights to the user making the request 140, logic associated with the application 115 grants access rights if the resource group's authorization table 150 indicates that the user has the assigned role necessary for performing the action in the user's request 140. For example, if the authorization table 150 indicates that user A has the role of an operator for resources in G1 146, then user A may start or stop a resource, such as any or all servers, in G1 146. On the other hand, the same logic associated with the application 115 denies access rights if the resource group's authorization table 150 indicates that the user does not have the assigned role necessary for performing the action in the user's request 140. Again, by example, if the authorization table 150 indicates that user A only has the role of a configurator for resources in G1 146, then user A's request 140 to start or stop a resource is denied because such actions are defined by the role of an operator. The granting or denial of access rights for the request 140 is then communicated over the network from the application to the user's computer system 120.

Figure 3:
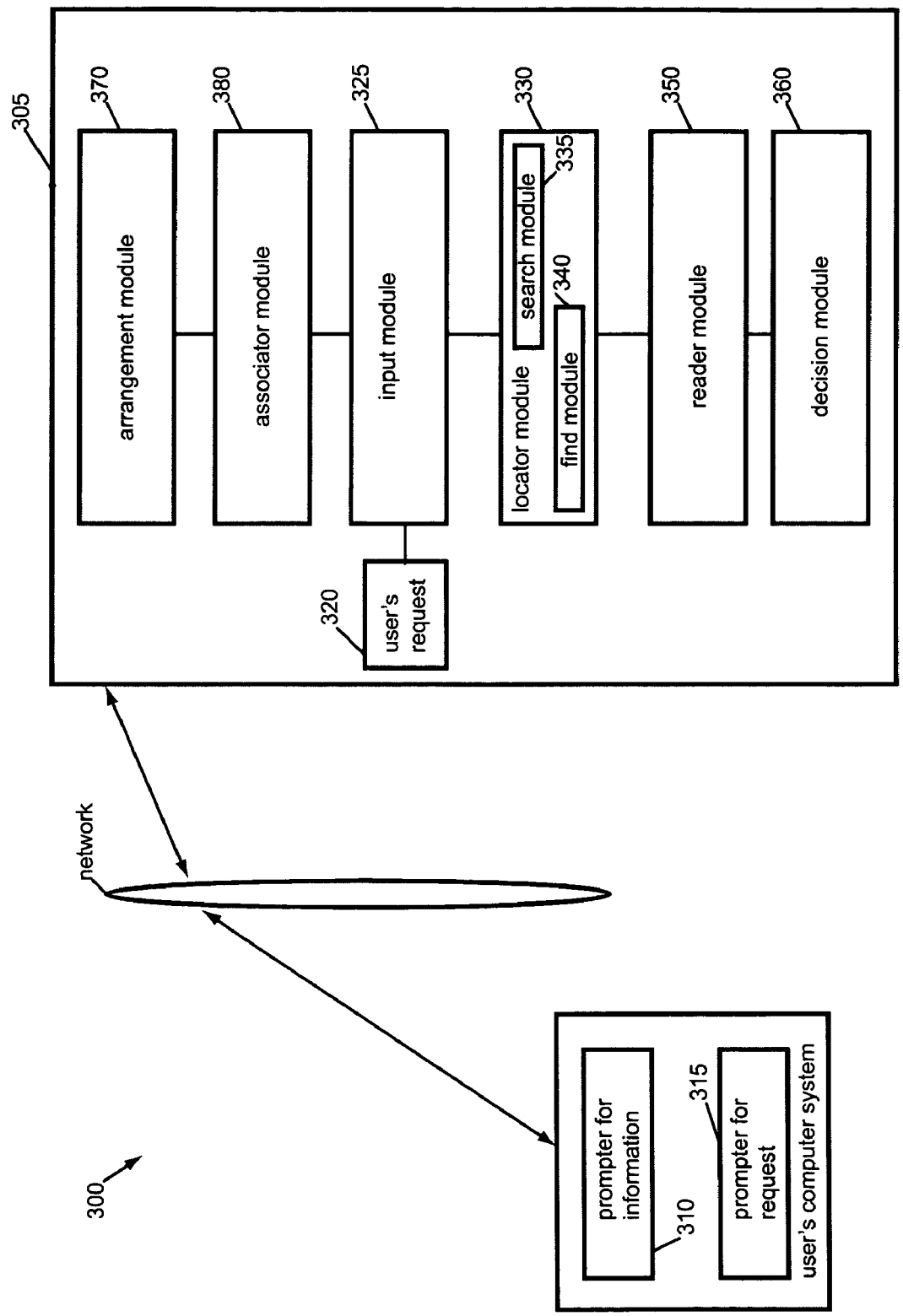
FIG. 3 depicts an example embodiment of a system for determining access rights to a resource managed by an application in accordance with the disclosed invention.

Turning now to FIG. 3, an example embodiment of another system 300 for determining access rights to a resource managed by an application 305 is disclosed. System 300 includes an application 305, wherein the application 305, for example, may be an application management server system such as WebSphere Application Server™, Web Services providing application management services, or a local application running on an organization's own networked, computer systems.

After a user logs onto a computer system 301 in communication, likely via a network 302, with the system 300's application 305, the system 300 optionally includes a prompter 310 for prompting the user at the user's computer system to enter security information to access the application 305. Such security information includes, for example, a user identifier and password verified by logic associated with the application 305. After successful logon to the application 305, the system 300 further includes another prompter 315 for prompting the user to enter a request 320 for performance of requested action on a particular resource managed by the application. The user then sends the request 320 to the application 305 for receipt and interpretation.

The system 300 includes an input module 325 for receiving the request 320. The input module 325, enabled by software code available at run time and/or hardware, such as a code reduced to a processor (collectively, "logic"), receives the user's request 320. The input module's 325 logic interprets and identifies the user, requested action and the particular resource on which the requested action is sought.

The system 300 also includes a locator module 330. After identification of the requested resource and requested action, the locator module 330 of the system 300 receives the identified request by logic either requesting the identified request from the input module 325 or the input module 325 sending the identified information to the locator module 330. The locator module 330, enabled by logic in associated software and/or hardware, includes component modules, namely a search module 335 and a find module 340, which may or may not be separate modules.

Before discussing the locator module 330, it is helpful to understand the organization of the resources implementing the system 300. A system administrator or otherwise empowered authority uses a further aspect of the system 300, namely an arrangement module 370. The arrangement module 370, enabled by logic in software and/or hardware associated with the system 300, permits arranging of the system's 300 resources into groupings of resources having similar authorization constraints within a cell, which encompasses all of the organization's resources; these groupings are re-configurable if the organization desires or needs to change the constraints for whatever reason. The groupings contain similarly constrained resources, and are arranged in a structure of lists or files, such as XML™ files. Returning now to the search module 335, enabled by software and/or hardware logic, the search module 335 searches the structure of groupings, and the find module 340, similarly enabled by logic, finds the resource in the grouping having the identified resource of the request.

The system 300 further includes a reader module 350 for reading the found resource based on the request, wherein the found resource of the request is passed from the locator module 330 to the reader module 350 by logic associated with the locator module 330 and/or the reader module 350. Before further discussing the reader module 350, it is necessary to understand a further aspect of the system 300, the associator module 380. The assoicator module 380, enabled by logic in software and/or hardware associated with the system 300, allows for associating each group of resources with its own, individualized authorization table, which maps roles to users.

For the resources in the particular group, the roles are permitted actions on the resources in that group. With the system 300 used for administration of resources, the roles, for example, may be limited to four broadly defined classes, including administrator, operator, configurator, and monitor, wherein the roles' namesakes also broadly represent the permitted actions, that is, administrating, operating, configuring, and monitoring, respectively. Variance of the system 300 in terms of the number of defined roles on the resource, the specific actions permitted by the roles, and the uses of the system 300 beyond administrative management of resources are contemplated and within the scope of the invention, although further examples are not explicitly discussed herein.

The reader module 350, enabled, for example, by coded logic or logic reduced to a processor, reads the authorization table associated with the group having the found resource of the request. Like the groupings, each group's authorization table is part of a structure of lists or files, such as XML™ files. By the reader module 350 reading the authorization table, the reader module identifies the permitted roles for users on the resources within the group having the found resource.

The system 300 also includes a decision module 360 for determining whether to grant the access rights for performing the action on the resource. The decision module 360, enabled by software and/or hardware logic, receives the information from the input module 325, locator module 330, and/or reader module 350 for determining whether to grant access rights to the user for the request 320. In particular, the decision module 360 receives the identity of the user, the identity of the found resource of the request 320, and the user's assigned role based on the found resource's group authorization table. Through still more logic associated with the decision module 360, the decision module 360 grants the requested action on the found resource if the requested action on the found resource is permitted by the user's assigned role. If the user does not have the assigned role to perform the requested action, then the decision module 360 denies the requested action on the found resource.

Figure 4:
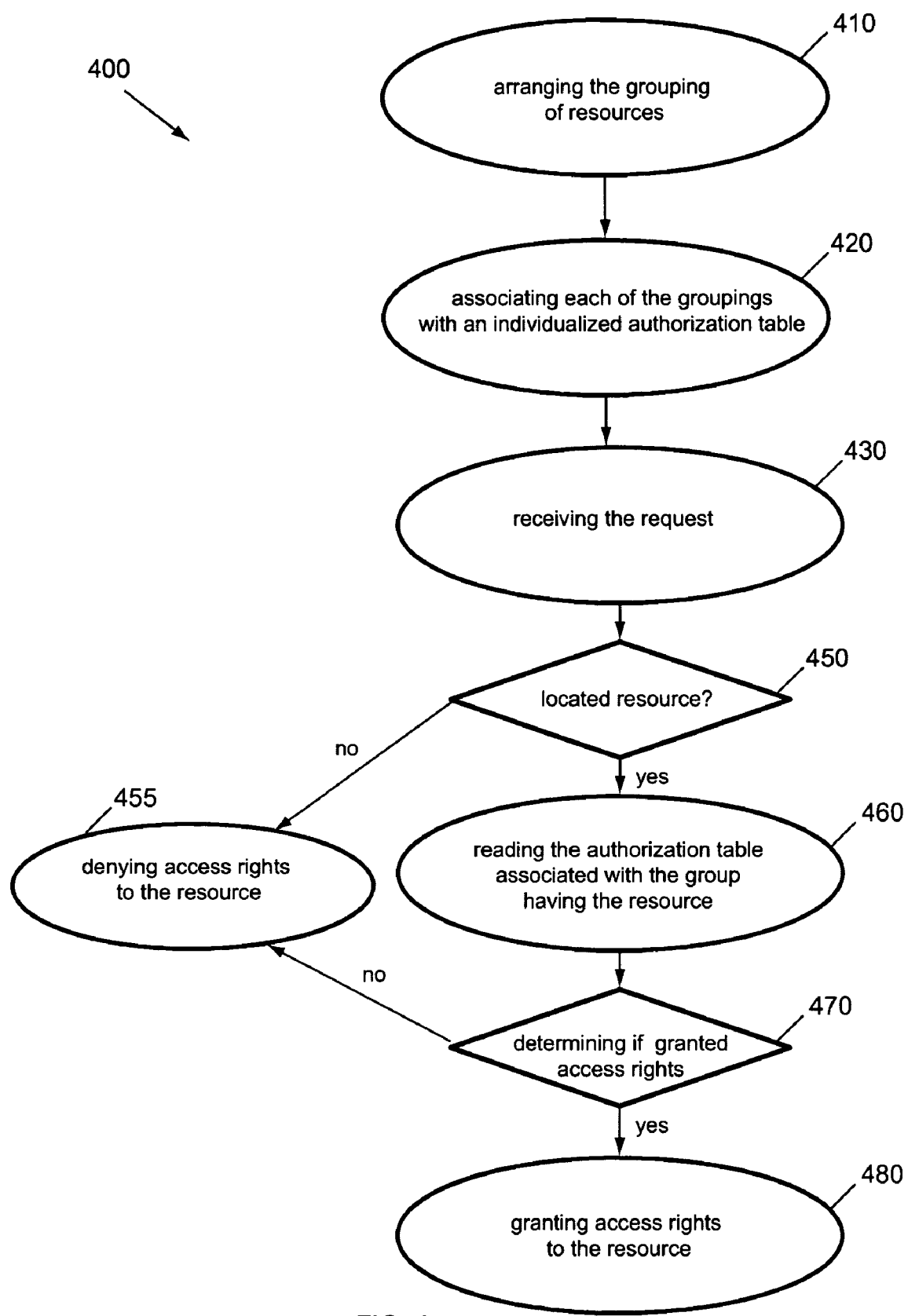
FIG. 4 depicts an example embodiment of a method for determining access rights to a resource managed by an application in accordance with the disclosed invention.

Turning now to FIG. 4, another aspect of the invention is disclosed. In particular, an embodiment of a flowchart 400 for determining access rights to resource managed by an application is disclosed. Flowchart 400 is for a system, such as systems 100 and 300, as shown in FIG. 1 and FIG. 3.

Flowchart 400 begins by arranging 410 an organization's resources managed by an application such as an application management server system. The resources, themselves, are typically nodes, clusters, applications and servers, just to name a few, which the application manages, for example, in an administrative manner, through a configured arrangement of the resources. The arranging 410, enabled by logic in software and/or hardware associated with the application or the user's computer system, occurs by a system administrator or other empowered authority arranging the resources into groupings having similar authorization constraints. That is, such groupings have resources that are isolated from an organization's other resources, whether those other resources are in other groups or smaller cells within the organization's overall cell of resources. Further, the resources in a particular group are grouped because it is likely, for whatever reason, that the users of the resources in a particular group need access to perform some or many actions on some or all of the resources in the group; equally, however, resources in other groups are in other groups because the just referenced users may not need to or are restricted from performing actions on resources in other groups. Hence, grouping of resources by similar authorization constraints provides security by mitigating the potential access rights to an organization's resources.

After arranging 410 the groupings of resources, the flowchart 400 continues by associating 420 each one of the groupings with its own authorization table. To particularize the authorization constraints on the similarly constrained resources within a grouping, software and/or hardware associated with the application or the user's computer system enables the associating 420 of an authorization table to a grouping. The authorization table is a mapping of roles to users, and, thereby, spells out what actions, here, in terms of roles, that every user may perform on the resources in the group. In an administrative management implementation, for example, the permitted actions may be defined in terms of four broadly classified roles, namely administrator, configurator, operator, and monitor. The arranging 420, therefore, fine tunes the associating 420, all of which occurs by an authority, whether a person or automated, generating lists or files, such as XML™ files, representative of the groupings and authorization tables.

Progressing further down the flowchart 400, the application receives 430 a request to perform an action on a particular resource. The request is likely generated and sent from a PDA or a user's computer system in network communication with the application managing the organization's resources. For receiving 430 the request, the user may directly entering the request into the application or the user may be prompted, perhaps at the user's computer system, to enter a request.

Before receiving 430 the request, however, the flowchart 400 may prompt a user seeking access to the application to enter security information. Upon verification, the user is granted access to the application. This added security measure ensures that only authorized users may attempt to perform an action on a resource managed by the application.

After receiving 430 the request, software and/or hardware logic associated with the application interprets the request to identify the relevant, constituent parts of the request. That is, the user, the requested action on a resource, and the requested resource on which the requested action is desired. Based on this interpreted information in the request, the flowchart 400 continues by locating 450, through software and/or hardware logic associated with the application, the requested resource by searching the groupings. Locating 450 in the flowchart 400 is depicted as a decision block because if the requested resource is not found upon searching the groupings, then the flowchart 400 returns with denying 455 of access rights to the requested resource. Such a denial of access rights may be communicated to the user by sending a message indicating denial of access rights, and, optionally, include a reason such as "file not found" or "resource does not exist." Upon finding the requested resource, however, in the grouping containing the requested resource, the flowchart 400 continues.

Moving down the flowchart 400, the flowchart 400 continues after locating 450 the found, requested resource by reading 460 an authorization table associated with the grouping containing the found, requested resource. Through software and/or hardware logic associated with the application, reading 460 the authorization table entails reading the roles assigned to the users for the actions on the resources in the group containing the found, requested resource.

The flowchart 400 culminates with a determination decision block 470 indicative of the determining whether to grant or deny access rights for the action on the request in the user's request. Again, enabled by software and/or hardware logic associated with the application, distillation of access rights to perform the request based on evaluating the now known quantities of user identity and the permissive actions, i.e., roles, on the found resource in the grouping containing the requested resource. If the known quantities align to indicate that the user has the role to perform the requested action on the requested resource, then the application's logic grants 480 access rights to the user to perform the requested action on the resource. Otherwise, if any of the known quantities do not align, then the application's logic denies 455 access rights to the user. The granting or denial of access rights is optionally communicated to the user by a message indicating that the request is accepted, as well as performed, or denied.

At this point, having discussed systems and methods, it is useful to discuss the achieved advantages. In particular, as compared to prior solutions, scalability is markedly increased by the grouping of similarly constrained resources and the authoization table. For example, instead of having individual files for access rights to resource 1, resource 2, resource 3 and resource 4, and assuming these four resources are used by fifty users, then grouping these similarly constrained resources into one group with an associated authorization table indicating the permitted actions on the resources by the fifty users results in the writing of two files, one for the group and one for the authorization table, instead of the perhaps fifty files necessary by the prior solutions. In addition, having two files instead of fifty files also significantly reduces the amount of storage necessary for access rights for managing the resources, as well as possibly decreasing the amount of processing time to determine whether access rights exist.

Figure 5:
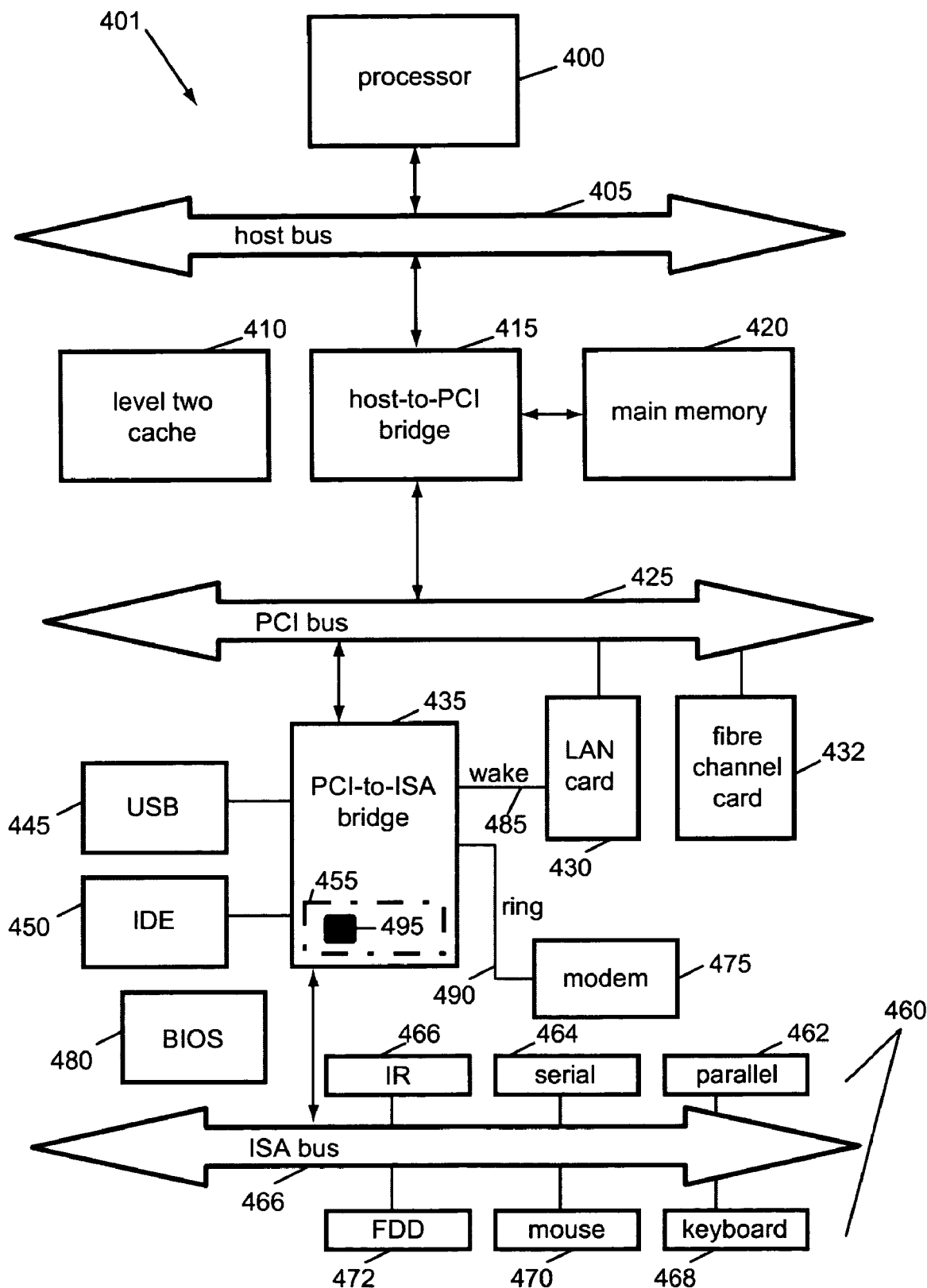
FIG. 5 depicts a system for determining access rights to a resource managed by an application in accordance with the disclosed invention.

FIG. 5 illustrates information handling system 501 which is a simplified example of a computer system capable of performing the operations described herein. Computer system 501 includes processor 500 which is coupled to host bus 505. A level two (L2) cache memory 510 is also coupled to the host bus 505. Host-to-PCI bridge 515 is coupled to main memory 520, includes cache memory and main memory control functions, and provides bus control to handle transfers among PCI bus 525, processor 500, L2 cache 510, main memory 520, and host bus 505. PCI bus 525 provides an interface for a variety of devices including, for example, LAN card 530. PCI-to-ISA bridge 535 provides bus control to handle transfers between PCI bus 525 and ISA bus 540, universal serial bus (USB) functionality 545, IDE device functionality 550, power management functionality 555, and can include other functional elements not shown, such as a real-time clock (RTC), DMA control, interrupt support, and system management bus support. Peripheral devices and input/output (I/O) devices can be attached to various interfaces 560 (e.g., parallel interface 562, serial interface 564, infrared (IR) interface 566, keyboard interface 568, mouse interface 570, fixed disk (HDD) 572, removable storage device 574) coupled to ISA bus 540. Alternatively, many I/O devices can be accommodated by a super I/O controller (not shown) attached to ISA bus 540.

BIOS 580 is coupled to ISA bus 540, and incorporates the necessary processor executable code for a variety of low-level system functions and system boot functions. BIOS 580 can be stored in any computer readable medium, including magnetic storage media, optical storage media, flash memory, random access memory, read only memory, and communications media conveying signals encoding the instructions (e.g., signals from a network). In order to attach computer system 501 to another computer system to copy files over a network, LAN card 530 is coupled to PCI bus 525 and to PCI-to-ISA bridge 535. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the invention described herein, this computer system is simply one example of a computer system. Those skilled in the art will appreciate that many other computer system designs are capable of performing the invention described herein.

Another embodiment of the invention is implemented as a program product for use with a computer system such as, for example, the system 100 shown in FIG. 1, and the system 300 shown in FIG. 3. The program(s) of the program product defines functions of the embodiments (including the methods described herein) and can be contained on a variety of media. Illustrative media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

While the foregoing is directed to example embodiments of the disclosed invention, other and further embodiments of the invention may be devised without departing from the basic scope thereof, and the scope thereof is determined by the claims that follow.

What is claimed is:

1. A method for determining access rights to a resource managed by an application, the method comprising:
   receiving a request by the application, wherein the request comprises an action a user seeks to perform on the resource;
   locating, based on the request, the resource in a structure having groupings of resources, wherein each of the groupings have similar authorization constraints for the resources therein;
   reading an authorization table associated with a grouping having the resource among the groupings, wherein the authorization table comprises a mapping of one or more roles to each user, and the roles comprise one or more permitted actions;
   determining, based on the reading, whether to grant the access rights for performing the action on the resource; and
   whereby, assigning users to one or more of the groupings permits enhanced scalability and limited storage requirements.

2. The method of claim 1, further comprising prompting the user for security information to access the application.

3. The method of claim 1, further comprising prompting the user for the request before the receiving a request.

4. The method of claim 1, further comprising, prior to the receiving, arranging the groupings by similar authorization constraints for the resources, and associating each of the groupings with the authorization table tailored for each of the groupings.

5. The method of claim 1, wherein the application comprises an application management server system.

6. The method of claim 1, wherein the locating comprises searching the structure and finding within the structure the grouping having the resource.

7. The method of claim 1, wherein the groupings and the authorization table comprise extensible markup language files.

8. The method of claim 1, wherein the reading comprises reading a mapping of roles to users, wherein the roles comprise a collection of actions permitted by the user on the resource.

9. The method of claim 8, wherein the action of the request is defined by one of the roles.

10. The method of claim 1, wherein the determining whether to grant access rights for performing the action on the resource to a user comprises granting access if the authorization table associated with the grouping having the resource indicates the user has permission to perform the action.

11. A device for determining access rights to a resource managed by an application, the device comprising:
- the application operable on a computer system having a processor;
- an input module associated with the application for receiving a request from a user in order to perform an action on a resource;
- a locator module associated with the application for locating, based on the request, the resource in a structure having groupings of resources, wherein each of the groupings have similar authorization constraints for the resources therein;
- a reader module associated with the application for reading an authorization table associated with a grouping having the resource among the groupings, wherein the authorization table comprises a mapping of one or more roles to each user, and the roles comprise one or more permitted actions;
- a decision module associated with the application for determining whether to grant the access rights for performing the action on the resource; and
- whereby, enhanced scalability and limited storage requirements result from assigning users to one or more of the groupings.

12. The device of claim 11, further comprising a prompter for entering security information to access the application.

13. The device of claim 11, further comprising a prompter for entering the request into the input module.

14. The device of claim 11, further comprising an arrangement module for arranging the groupings of resources by similar authorization constraints, and an associator module for associating each of the groupings with the authorization table tailored for each of the groupings.

15. The device of claim 11, wherein the application comprises an application management server system.

16. The device of claim 11, wherein the locator module comprises a search module for searching the structure and a find module for finding in the structure the grouping having the resource.

17. The device of claim 11, wherein the groupings and the authorization table comprise extensible markup language files.

18. The device of claim 11, wherein the reader module comprises reading a mapping of roles to users, wherein the roles comprise a collection of actions permitted by the user on the resource.

19. The device of claim 18, wherein the action of the request is defined by one of the roles.

20. The device of claim 11, wherein the decision module for determining whether to grant access rights for performing the action on the resource to a user comprises granting access if the authorization table associated with the grouping having the resource indicates the user has permission to perform the action.

21. A machine-accessible storage medium containing instructions, which when executed by a machine, cause the machine to perform operations for determining access rights to a resource managed by an application, comprising:
- receiving a request by the application, wherein the request comprises an action a user seeks to perform on the resource;
- locating, based on the request, the resource in a structure having groupings of resources, wherein each of the groupings have similar authorization constraints for the resources therein;
- reading an authorization table associated with a grouping having the resource among the groupings, wherein the authorization table comprises a mapping of one or more roles to each user, and the roles comprise one or more permitted actions;
- determining, based on the reading, whether to grant the access rights for performing the action on the resource; and
- whereby, assigning users to one or more of the groupings permits enhanced scalability and limited storage requirements.

22. The machine-accessible storage medium of claim 21, further comprising instructions to perform operations for prompting the user for security information to access the application.

23. The machine-accessible storage medium of claim 21, further comprising instructions to perform operations for prompting a user for the request before the receiving a request.

24. The machine-accessible storage medium of claim 21, further comprising, prior to the instructions to perform operations for receiving, instructions to perform operations for arranging the groupings by similar authorization constraints for the resources, and instructions to perform operations for associating each of the groupings with the authorization table tailored for each of the groupings.

25. The machine-accessible storage medium of claim 21, wherein the application comprises an application management server system.

26. The machine-accessible storage medium of claim 21, wherein the instructions for locating comprise instructions to perform operations for searching the structure and instructions to perform operations for finding within the structure the grouping having the resource.

27. The machine-accessible storage medium of claim 21, wherein the groupings and the authorization table comprise extensible markup language files.

28. The machine-accessible storage medium of claim 21, wherein instructions for reading comprise instructions for reading a mapping of roles to users, wherein the roles comprise a collection of actions permitted by the user on the resource.

29. The machine-accessible storage medium of claim 28, wherein the action of the request is defined by one of the roles.

30. The machine-accessible storage medium of claim 21, wherein the instructions for determining whether to grant access rights for performing the action on the resource to a user comprise instructions for granting access if the authorization table associated with the grouping having the resource indicates the user has permission to perform the action.

* * * * *